United States Patent [19]
Wong et al.

[11] Patent Number: 5,887,829
[45] Date of Patent: Mar. 30, 1999

[54] AUTOMOTIVE VEHICLE DUAL MEDIA ASSEMBLY MOUNTING BRACKET

[75] Inventors: Fermin Samuel Wong; Nazih Kamal Hijaouy, both of Canton; Jason Dale Perkins, Chelsea; Thomas Leo Jean, Royal Oak, all of Mich.

[73] Assignee: Ford Global Technologies, Inc., Dearborn, Mich.

[21] Appl. No.: 888,251

[22] Filed: Jul. 7, 1997

[51] Int. Cl.⁶ ........................................... G12B 9/00
[52] U.S. Cl. ............................................. 248/27.1
[58] Field of Search .................. 248/27.1, 27.3, 248/316.7, 316.8; 24/290, 291, 295, 297; 403/13, 14; 439/297, 298, 354, 378

[56] References Cited

U.S. PATENT DOCUMENTS

| | | | |
|---|---|---|---|
| 5,062,604 | 11/1991 | Monnier | 248/27.1 |
| 5,410,373 | 4/1995 | Sagues et al. | 248/27.1 |
| 5,430,612 | 7/1995 | Simon et al. | 248/27.1 |

*Primary Examiner*—Ramon O. Ramirez
*Assistant Examiner*—Willie Berry, Jr.
*Attorney, Agent, or Firm*—Steven A. Maynard

[57] ABSTRACT

A media componentry assembly for mounting in a compartment formed in an automotive vehicle instrument panel includes, a chassis adapted to be mountably received within the compartment and a unitary cast bracket having a plurality of surfaces for mounting a plurality of components adapted to be mountably received within the chassis.

15 Claims, 4 Drawing Sheets

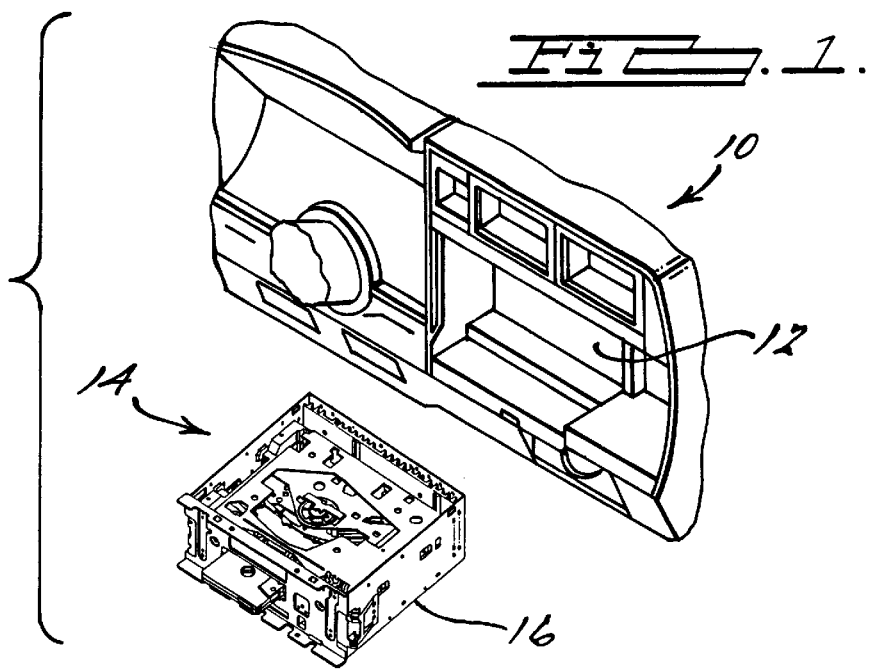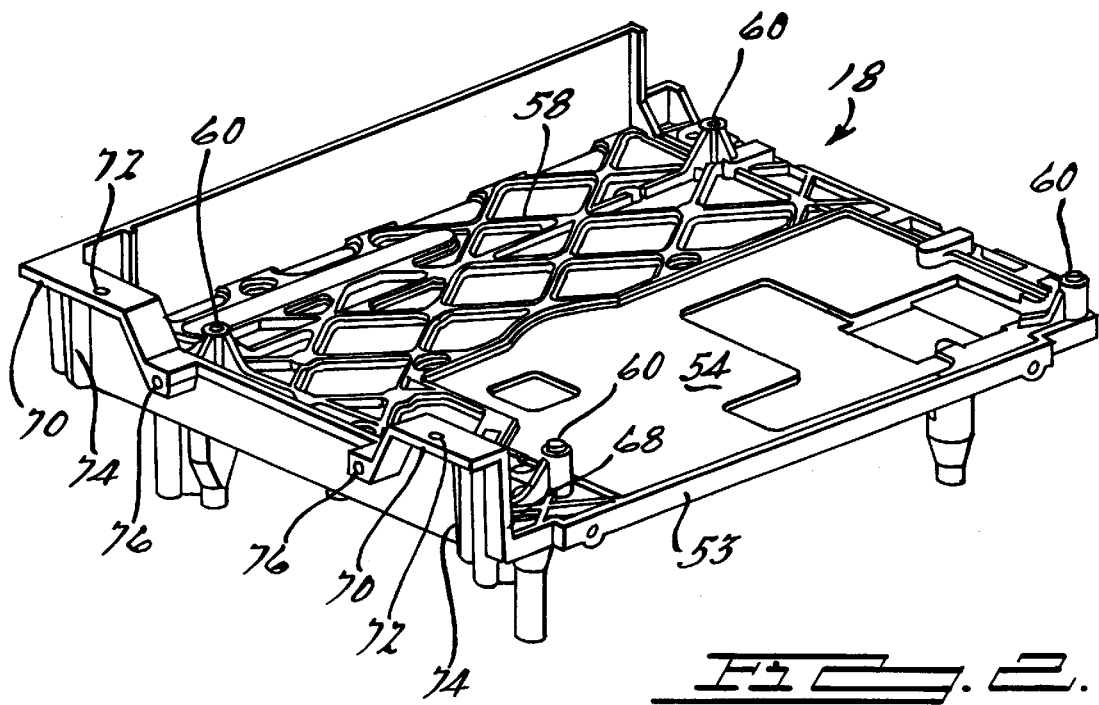

AUTOMOTIVE VEHICLE DUAL MEDIA ASSEMBLY MOUNTING BRACKET

FIELD OF THE INVENTION

The present invention relates to automotive vehicle mounting brackets, and more specifically, to a mounting bracket for a dual media assembly.

BACKGROUND OF THE INVENTION

In the manufacture of automotive vehicles it is a customer desire to have certain types of media componentry located in the instrument panel. In recent years there has been a proliferation of various forms of media. Exemplary of such forms are the cassette tape, the compact disc, and the digital audio tape. As a result, automotive manufacturing efforts have advanced to provide the consumer with combined instrument panel located media components. The dual compact disc/cassette tape deck is one such exemplary combination. The mechanical and electrical mounting of such components in the instrument panel bears with it a unique set of problems. Such problems require a consideration of the operating sensitivity of various components in a vehicle environment, manufacturing and servicing ease, manufacturing cost, and part cost.

An approach to mounting a dual media system within a vehicle is to create a unitary assembly of all componentry and sub-componentry that can be singularly inserted into the instrument panel. Such an assembly conventionally has a sheet metal external housing or chassis. This chassis typically has three side walls, a fourth front plate which is adaptable to receive componentry control panel bezels, and a base. Typically the base is a circuit board. The media components are shrouded with sheet metal carriers, each carrier having a geometry unique to the individual media component type, and mounted within the chassis. A first component is mechanically mounted, via the carrier, to the chassis adjacent the circuit board, and then electrically connected to the circuit board. The second component is then electrically connected to the circuit board via a flex cable and mechanically mounted, via the carrier, to the chassis adjacent the first component, thereby creating a conventional dual media assembly. The assembly is then unitarily mounted within the vehicle instrument panel. There are a number of disadvantages associated with such a dual media assembly.

A disadvantage with the conventional assembly is the cumbersome assembly process. Each component must be separately mechanically mounted to the chassis and separately electrically connected to the circuit board which makes for a time consuming assembly process. Performing the assembly within the confines of a radio chassis only magnifies this cumbersome process. Such manufacturing concerns increase the overall product cost. A further disadvantage is servicing difficulty. For example, if the component adjacent the circuit board needs servicing the component above must be removed first, thereby increasing service time and cost. A still further disadvantage is the unreusability of the chassis. Each component, in previous designs, has a sheet metal carrier specific to the particular component dimensions. The design of the chassis is therefore dependent on the dimensions of the carrier for a particular component. If a consumer wished to change a component, the new carrier for that component would require a new chassis. Another disadvantage is the need for a flex cable to electrically connect the second component to the circuit board. Upon assembly the flex cable will inherently be sandwiched between the first and second components as the second component is mechanically mounted to the chassis. Over the life of the assembly the flex cable can interfere with the mechanical movement of one or both of the components and cause a system failure requiring service. Still another disadvantage is the plurality of mechanical parts necessary to support and mount the components. The conventional assembly requires a separate chassis for each component as well as mounting and aligning mechanisms for each chassis. This results in a high degree of packaging space necessary to accommodate the componentry and the associated mounting and supporting mechanisms.

It is therefore desirable, particularly when using dual media assemblies, to provide an assembly which is easily manufacturable, easily serviceable, reusable, not prone to causing system failure, and accommodating to the packaging space requirements of modern automotive vehicle designs.

SUMMARY OF THE INVENTION

Responsive to the deficiencies in the prior art, the present invention provides a dual media assembly for mounting in a compartment formed in an automotive vehicle instrument panel, the dual media assembly includes, a unitary bracket having a plurality of planar parallel surfaces for mounting a plurality of components and adapted to be mounted within the compartment.

According to a feature of the present invention, a pair of four mounting posts are disposed on opposing surfaces and project perpendicularly therefrom for mounting various media componentry.

According to a preferred embodiment of the present invention, the dual media assembly further includes a chassis within which is mounted the unitary bracket, the chassis being mounted within the compartment.

An advantage of the present invention is that a unitary bracket is used to carry multiple media components. If the media components are changed, for example from a compact disc player to a digital audio tape player, only the bracket is redesigned rather than the chassis which saves in overall product cost.

BRIEF DESCRIPTION OF THE DRAWINGS

Other features and advantages of the present invention will become apparent to those skilled in the automotive vehicle lighting arts upon reading the following description with reference to the accompanying drawings, in which:

FIG. 1 is a perspective view of an automotive vehicle instrument panel with a dual media assembly according to the present invention;

FIG. 2 is a perspective view of a first surface of a unitary bracket according to the present invention;

DETAILED DESCRIPTION OF THE PREFERRED EMBODIMENT

Figure 4:
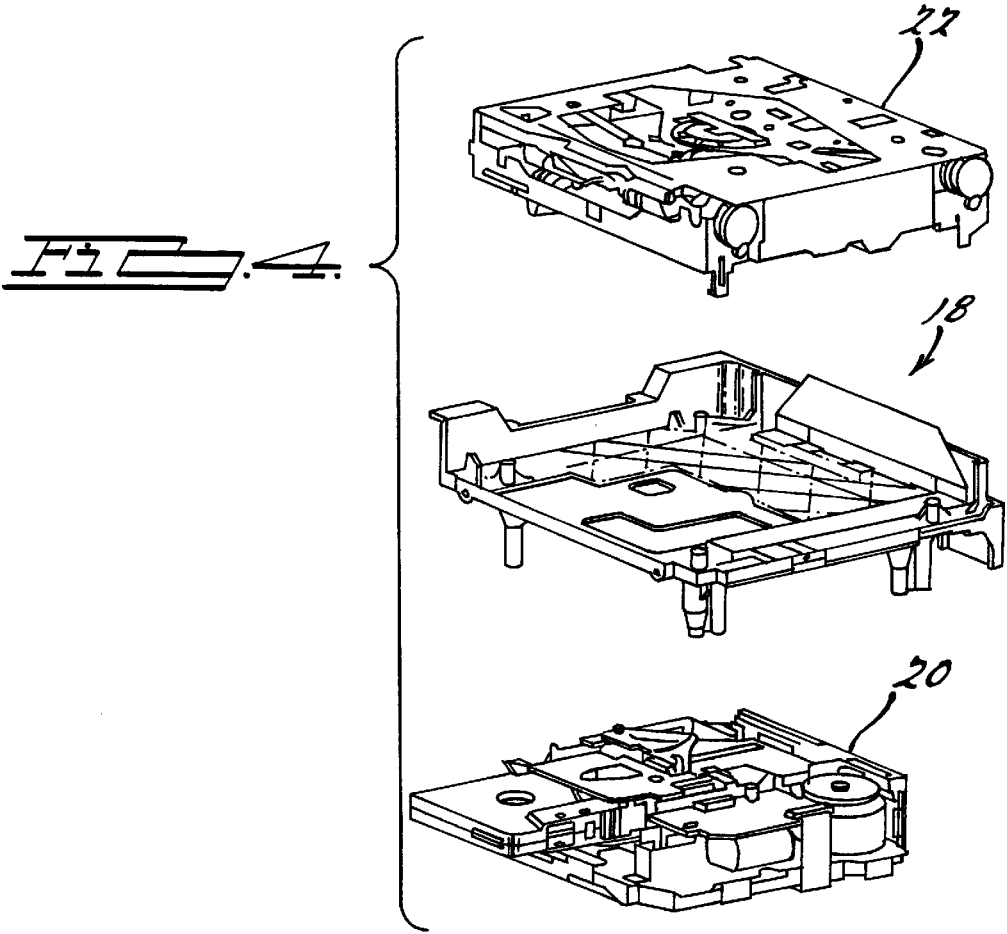
FIG. 4 is a perspective view of a unitary bracket mountable with a cassette tape player and a compact disc player according to the present invention.

Turning now to the drawings, and in particular to FIG. 1 and 4 thereof, an automotive vehicle instrument panel 10 is shown having an aperture 12 adapted to receive a dual media assembly 14. The dual media assembly 14 has a chassis 16 having a generally box-like configuration. Disposed therein is a dual media mounting bracket 18 having audio components mounted thereon. Exemplary of such components are a cassette tape player 20 and a compact disc player 22.

Figure 6:
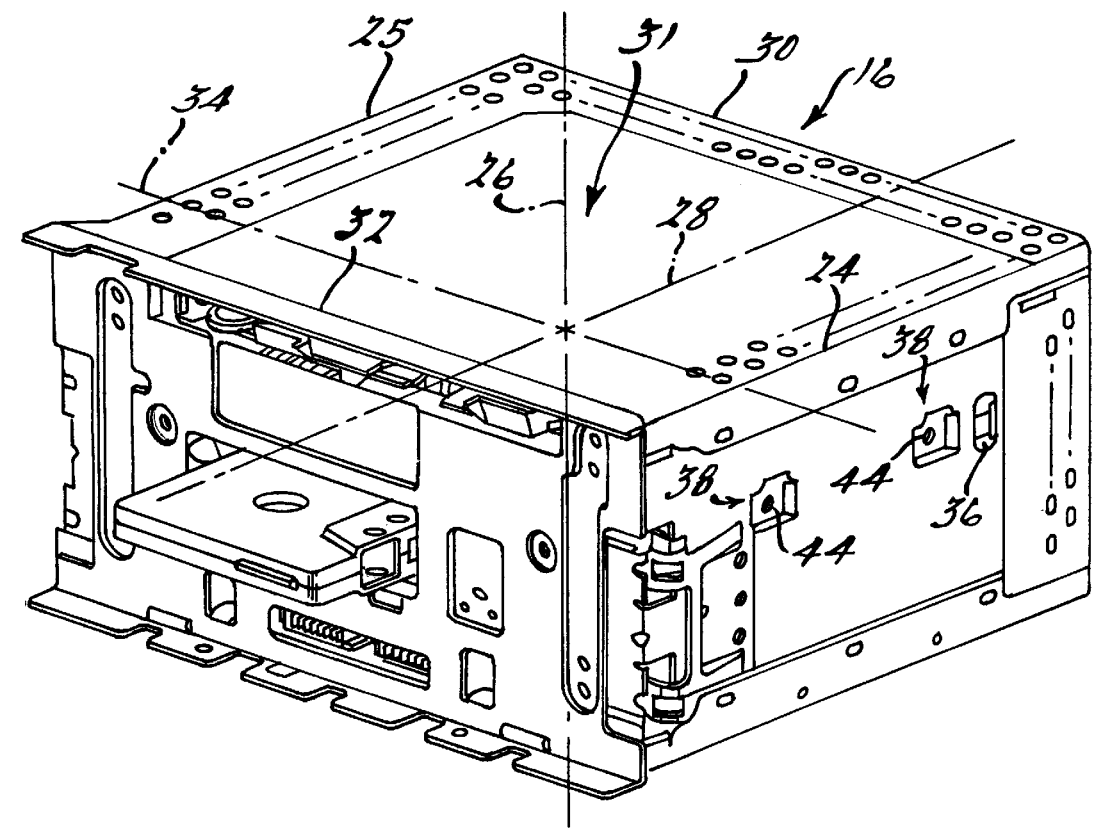
FIG. 6 is perspective view of a chassis according to the present invention.
Figure 7:
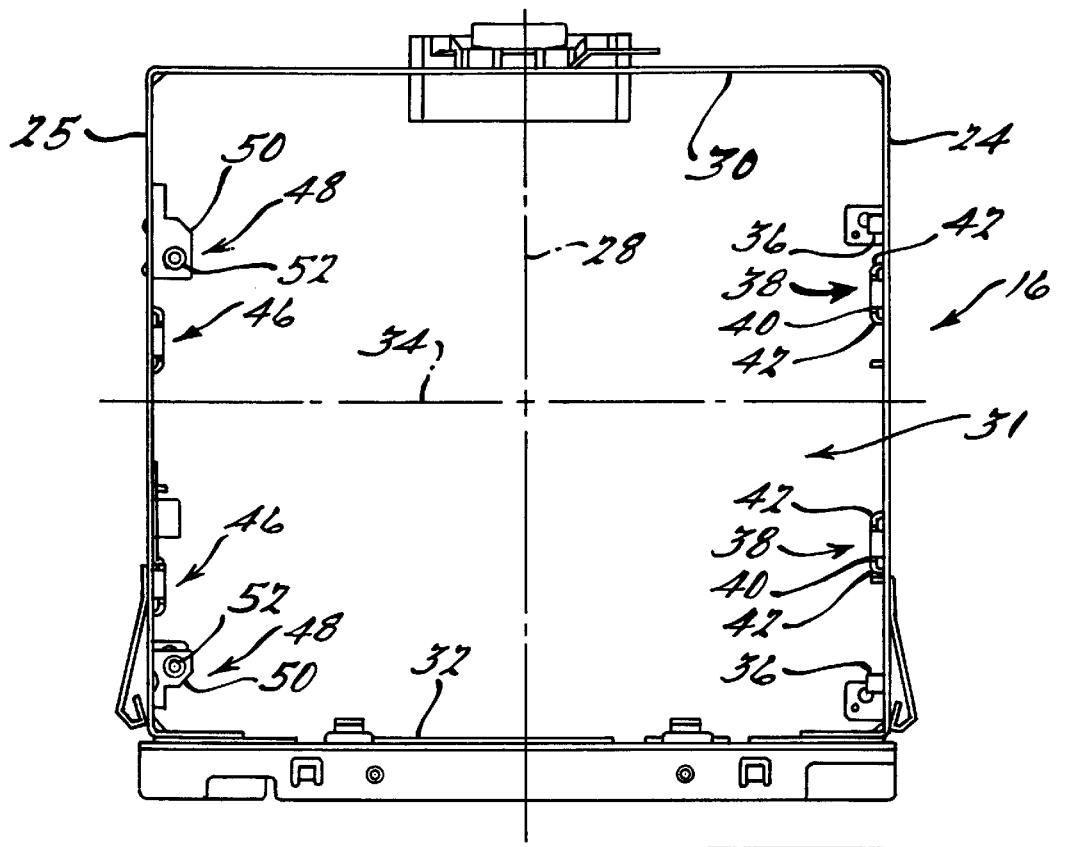
FIG. 7 is a top view of a chassis according to the present invention.

As shown in FIGS. 6 and 7, the chassis 16 is a sheet metal stamping having a pair of side walls, 24 and 25, generally parallel to a Y and Z axis, 26 and 28 respectively, a back wall 30 and a bezel mounting wall 32, both parallel to a X and Y axis, 34 and 26 respectively. The pair of side walls, 24 and 25, back wall 30, and bezel mounting wall 32 form an inner spaced region 31 adapted to receive the dual media mounting bracket 18. Projecting inwardly from a first side wall 24 are a pair of mechanical stop tabs 36. The stop tabs 24 are planar surfaces, perpendicular to the Y axis 26, which function to locate the mounting bracket 18 along the Y axis 26. Adjacent to the stop tabs 26, projecting inwardly of the first side wall 24, are a first pair of locating ramps 38. The locating ramps 38 each have a planar surface 40, parallel to the first side wall 24, with ramped surfaces 42 projecting therefrom toward and terminating at the first side wall 24. Each planar surface 40 has an aperture 44 therethrough adapted to receive a conventional fastener for fastening the mounting bracket 18 along the X axis 34. The ramped surfaces 42 function to locate the mounting bracket 18 along the X and Z axes, 34 and 28 respectively. Disposed on an opposing second side wall 25 are a second pair of locating ramps 46 illustrated as being formed as mirror images of the first pair of locating ramps 38. Those skilled in the mechanical arts will appreciate that the mirrored components of the second locating ramps 46 are essentially structurally and functionally identical to those of the first pair of locating ramps 38. Adjacent the second locating ramps 46 are a pair of inwardly projecting mechanical locating stops 48. The locating stops 48 are planar surfaces perpendicular to the Y axis 26 each having a ramped portion 50. The locating stops 48 function to locate the mounting bracket 18 along the Y axis 26 and the ramped portions 50 locate the mounting bracket 18 along the X and Z axes, 34 and 28. An aperture 52 is formed in each locating stop 48, each aperture 52 adapted to receive a conventional fastener for fastening the mounting bracket 18 in a direction along the Y axis 26.

Figure 3:
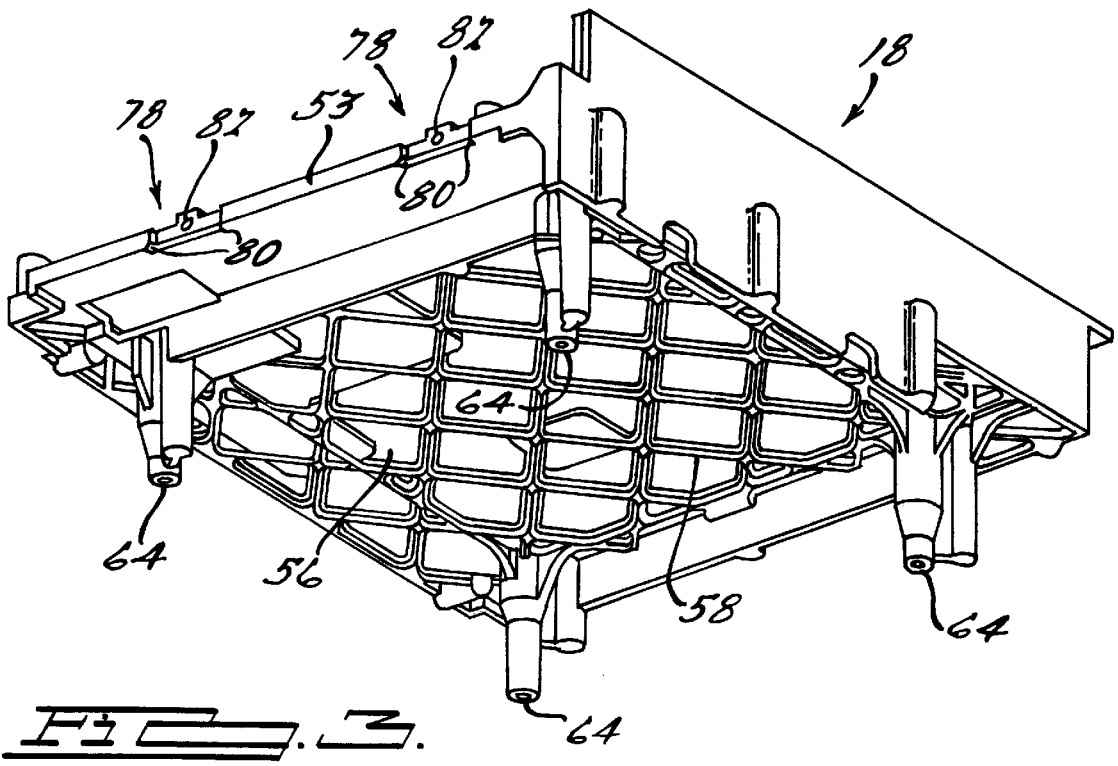
FIG. 3 is a perspective view of a second surface of a unitary bracket according to the present invention.

As shown in FIGS. 2–4, a dual media mounting bracket 18 has opposing, substantially planer, rectangular first and second surfaces, 54 and 56 respectively. Disposed on the opposing surfaces, 54 and 56, is a raised webbing 58 to provide torsional rigidity to the mounting bracket 18. Projecting from the first surface 54 are four mounting posts 60 for mounting a media mechanism such as a compact disc player 22. Projecting from the second surface 56 are four mounting bosses 64 for mounting a media mechanism such as a cassette tape player 20. Projecting perpendicular to a peripheral edge 53 of the first surface 54 is a side wall 68. Projecting from the side wall 68 and outwardly from the first surface 54 are a pair of planar positioning platforms 70 for engaging the locating stops 48 of the chassis 16. A hole 72 is formed in each positioning platform 70 and located to communicate with the apertures 52 formed in the locating stops 48 of the chassis 16. Projecting perpendicular to the positioning platforms 70 as well as the side wall 68 are a pair of tapered guide ribs 74 adapted to engage the ramped portions 50 of the locating stops 48 of the chassis 16. Adjacent the locating stops 48 and the guide ribs 74, projecting perpendicular to the side wall 68, are a pair of side wall mounting bosses 76 located to communicate with the apertures of the second pair of locating ramps 46 of the chassis 16. Disposed on the peripheral edge 53 and projecting outwardly of the first surface 54 are a pair of guide notches 78. Each notch 78 has opposing canted portions 80 adapted to engage the first locating ramps 38 of the chassis 16. A chassis mounting hole 82, the longitudinal axis of which is parallel to the first surface 54, is formed intermediate the opposing canted portions 80 of each notch 78 and adapted to communicate with the apertures 44 of the first locating ramps 38 of the chassis 16.

Media componentry can be highly sensitive to vibration, this is especially so with compact disc players 22. The assembly must therefore be constructed with consideration given to the natural frequency of the overall environment, in this case the automobile and the subcomponentry surrounding the dual media assembly 14. The natural frequency is a frequency value of a structural system such that when the external forcing frequency to the structure is equal to this value, the vibration amplitude of the structure becomes excessively large which is a condition to be avoided with such sensitive componentry. A structural system may possess one, two, or up to an infinite number of discrete natural frequencies. If an instrument panel 10 first natural frequency is approximately 30 Hertz, and a compact disc player 62 second natural frequency is below 100 Hertz, then the third natural frequency of the mounting bracket 18 and chassis 16 is preferably 200 Hertz. The design of the mounting bracket 18 with raised webbing 58 as well as choosing a material for the bracket 18 with a high torsional rigidity are both instrumental in obtaining a high natural frequency for the media assembly 14. A preferable method of manufacture and material for the bracket 18 is to cast the bracket out of magnesium.

Figure 5:
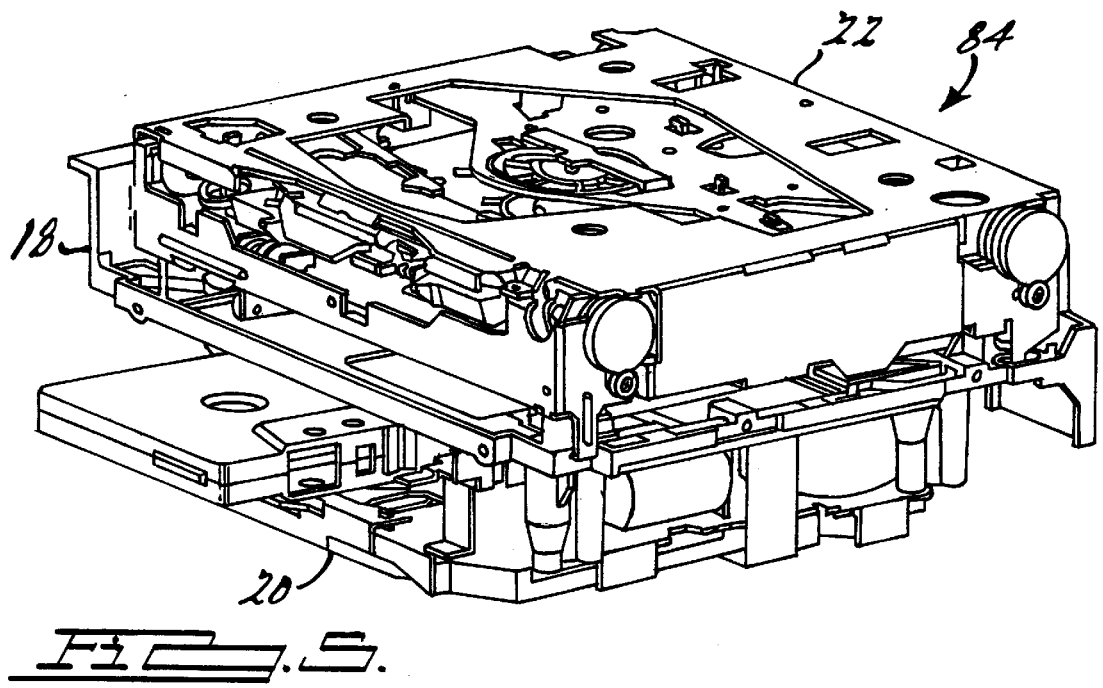
FIG. 5 is a perspective view of a unitary bracket assembled with a cassette tape player and a compact disc player according to the present invention.
Figure 8:
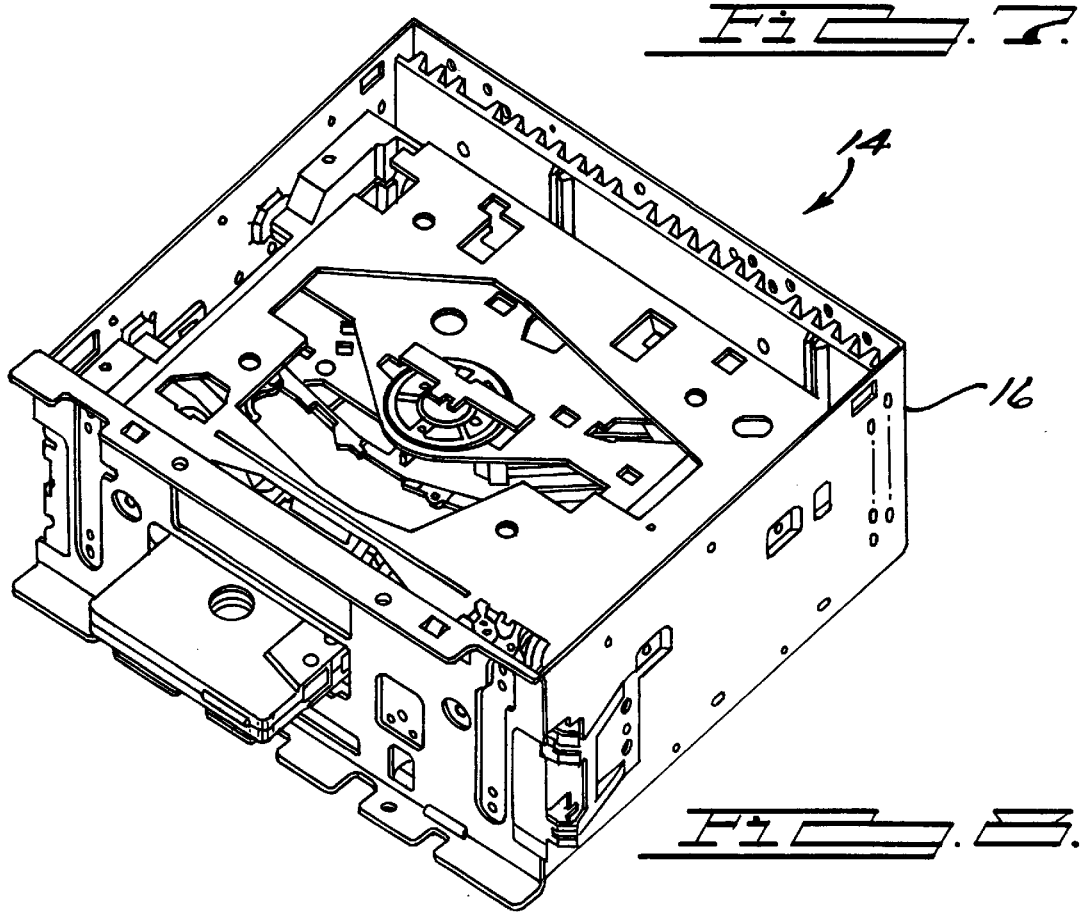
FIG. 8 is a perspective view of a dual media assembly according to the present invention.

During assembly, the compact disc player 22 is rigidly mounted to the posts 60 of the first surface 54 using a conventional fastener. The cassette tape player 20 is rigidly mounted to the bosses 64 of the second surface 56 in a similar fashion. This subassembly 84, as shown in FIG. 5, is thereupon inserted into the chassis 16. Insertion of the subassembly 84 into the chassis 16 causes the engagement of the guide ribs 74 of the bracket 18 with the corresponding locating stops 48 of the chassis 16 as well as the engagement of the guide notches 78 of the bracket 18 with the corresponding locating ramps 38 and 46 of the chassis 16. After full insertion, the bracket 18 is located in a predetermined position so that the holes 72, 76, and 82 of the bracket 18 are aligned with a corresponding aperture 44 and 52 of the chassis 16. The bracket 18 is then rigidly mounted to the chassis 16 via the corresponding holes and apertures with a conventional fastener such as a screw, thereby completing a dual media assembly 14, as best shown in FIG. 8. The dual media assembly 14 is then mounted in the compartment 12 of the instrument panel 10 in conventional fashion.

Only one embodiment of a unitary mounting bracket for a dual media assembly for an automotive vehicle of the present invention has been described. Those skilled in the automotive audio-mechanical arts will appreciate that others may be possible without departing from the scope of the following claims.

We claim:

1. A dual media assembly for mounting in a compartment formed in an automotive vehicle instrument panel, the dual media assembly comprising:

a unitary bracket having a plurality of planar parallel surfaces with sets of four mounting posts disposed on each surface and projecting perpendicularly therefrom for mounting a plurality of components and adapted to be mounted within the compartment.

2. A dual media assembly according to claim 1, further including a chassis within which is mounted the unitary bracket, the chassis mounted within the compartment.

3. A dual media assembly according to claim 2, wherein the unitary bracket further comprises means for mounting the bracket to the chassis disposed about a peripheral edge of the planar parallel surfaces.

4. A dual media assembly according to claim 3, wherein the means for mounting the bracket to the chassis comprises a plurality of mounting holes having longitudinal axes which project parallel to the plurality of surfaces.

5. A dual media assembly according to claim 4, wherein the unitary bracket further comprises means for positively locating the unitary bracket in a predetermined location within the chassis, disposed about a peripheral edge of the planar parallel surfaces.

6. A dual media assembly according to claim 5, wherein the means for positively locating comprises:

a plurality of guide ribs and a plurality of guide notches disposed on the perimeter edge of the plurality of surfaces of the unitary bracket;

a plurality of locating stops and a plurality of locating ramps disposed on a plurality of inner walls of the chassis; and wherein upon mounting the unitary bracket within the chassis the plurality of guide ribs mate with a plurality of corresponding locating stops and the plurality of guide notches mate with a plurality of locating ramps so as to positively locate the unitary bracket in a predetermined position within the chassis.

7. A dual media assembly according to claim 1, wherein the unitary bracket is a casting.

8. A dual media assembly according to claim 7 wherein the bracket has a predetermined natural frequency.

9. A dual media assembly according to claim 8, wherein the casting is formed from magnesium.

10. A dual media assembly according to claim 8, wherein the predetermined natural frequency of the bracket is approximately 200 Hertz.

11. A dual media assembly for mounting in an automotive vehicle instrument panel, the dual media assembly comprising:

a unitary bracket having a generally flat first surface with a first set of four mounting posts disposed thereon and projecting perpendicularly therefrom and a generally flat second surface, substantially parallel to the first surface, with a second set of four mounting posts disposed thereon and projecting perpendicularly therefrom;

a first media component mounted to the first set of four mounting posts; and a second media component mounted to the second set of four mounting posts.

12. A dual media assembly according to claim 11 wherein the unitary bracket and has a predetermined natural frequency.

13. A dual media assembly according to claim 12, wherein the casting is formed from magnesium.

14. A dual media assembly according to claim 12, wherein the predetermined natural frequency of the bracket is approximately 200 Hertz.

15. A dual media assembly for mounting in an automotive vehicle instrument panel, the dual media assembly comprising:

a chassis adapted to receive a unitary cast bracket, the chassis mountable within the instrument panel;

a unitary cast bracket, the bracket is cast of magnesium and having a natural frequency of approximately 200 Hertz, adapted to be received by the chassis, the unitary cast bracket having a generally planar first surface and a generally planar second surface substantially parallel to the first surface;

a first media component mounted to the first surface; and a second media component mounted to the second surface.

* * * * *